Jan. 11, 1949.  A. COHEN  2,459,016
VEHICLE ANTISKID MECHANISM AND WHEEL JACK
Filed Jan. 4, 1946

INVENTOR
ABE COHEN
BY Arthur H. Sturges
ATTORNEY

Patented Jan. 11, 1949

2,459,016

UNITED STATES PATENT OFFICE 2,459,016

VEHICLE ANTISKID MECHANISM AND WHEEL JACK

Abe Cohen, Omaha, Nebr.

Application January 4, 1946, Serial No. 639,093

7 Claims. (Cl. 188—5)

1

The present invention relates to the transportation art and more particularly to automobiles and has for an object to provide an improved mechanism and mode of operation thereof with respect to my prior Letters Patent No. 1,972,702.

More particularly, it is an object of the present invention to utilize the power of an engine of an automobile for jacking up one or more of the wheels thereof, whereby the tires of said wheels may be exchanged for other similar tires at desired times.

Another object of the invention is to provide a device for the above stated purposes which may be readily attached to or removed from an automobile, truck or the like and which may be employed as an anti-skid device at desired times such as during a travel of the vehicle upon wet and slippery pavements, roads covered with ice and the like, and also while descending hilly roads, said device to be so constructed that it may be readily employed, if desired, for anchoring a vehicle on a roadway, including a comparatively steep roadway, at times when the braking system of the vehicle is not sufficient for said purpose or at times when there is a failure of said braking system.

Other and further objects and advantages of the invention will be understood from the following detailed description thereof.

Figure 1:
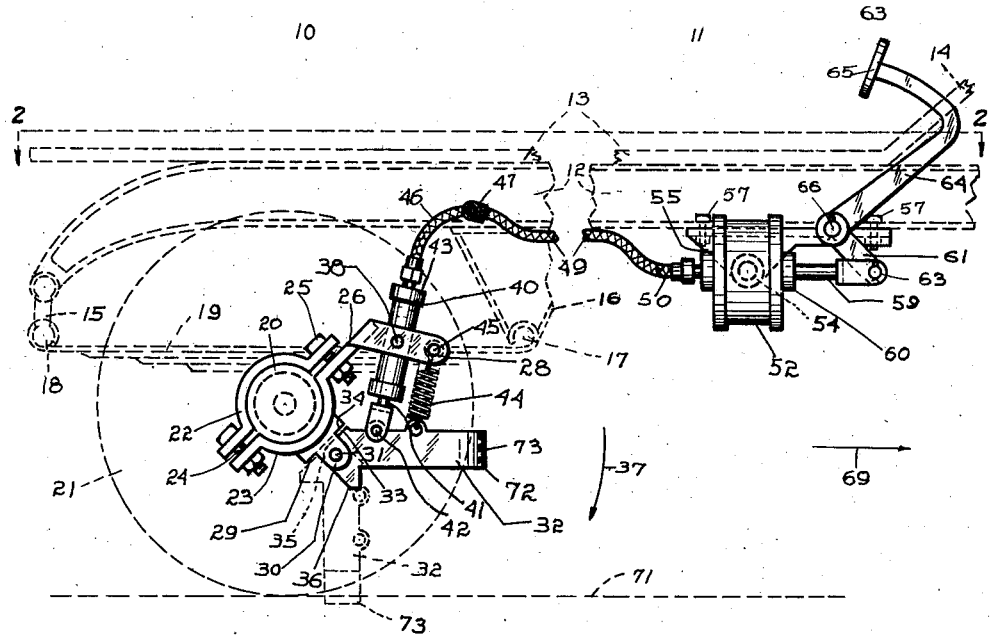
Figure 1 is a side elevation of the new device as applied, in a position of use, to the chassis of an automobile, said chassis being represented primarily by means of dotted lines, the view being taken substantially on line I—I of Figure 2.

Referring now to the drawing for a more particular description, 10 indicates generally a self-propelled vehicle such as an automobile, truck or the like, and 11 generally indicates the engine thereof. The engine is mounted between the oppositely disposed side frame rails of the chassis and one of said frame rails is indicated at 12. The floor of the body of the vehicle is indicated at 13 and the inclined foot board thereof at 14.

The rear end of the frame rail 12 is provided with a shackle-hanger 15 and a support 16 is disposed forwardly thereof, the upper end of the support 16 being secured to the frame rail 12.

Shackle-bolts 17 and 18 are provided for securing the ends of a spring 19 respectively to the shackles 15 and 16 in a well-known manner.

The vehicle includes a rear axle housing 20,

2 having a rear wheel at each end thereof. Only the rear wheel 21 is shown in the drawing by means of dotted lines. The spring 19 is secured to the axle housing 20 in a well-known manner and the foregoing minutely described and numbered parts are of conventional construction. Several parts of the new device are attached to the rear axle housing 20 and adjacent the wheel 21 and it will be understood that similar parts are secured to the other end of the axle housing and adjacent the other rear wheel of the vehicle and since those portions of the device adjacent the rear wheel which is not shown are a duplication of the parts which are adjacent the wheel 21, but one set of said parts is minutely described herein.

It is well known that the axle housings 20 are circular in cross section and with respect to many automobiles and for rear axle housings which are not circular adjacent the attachment of the new device thereto, the same may be readily made circular by attaching shims to said housings.

In the practice of the present invention, a support is secured to the rear axle 20. Preferably the support is a shackle disposed around or about the rear axle housing 20. The shackle is of two-piece construction and consisting of the parts indicated at 22 and 23, each of which is provided with oppositely disposed ears at its end. Bolts 24 and 25 are disposed through said ears for clamping the shackle about the axle housing 20. As thus described, it will be seen that at times when the nuts of the bolts 24 and 25 are turned sufficiently on the threads of the bolts for the purpose, the shackle may be rigidly locked to the axle housing.

The shackle portion 23 has an ear 26 which is outstanding with respect to other portions of the shackle and oppositely disposed arms 27 and 28 are provided integral with the ear 26, whereby the latter is provided with a bifurcated end.

The shackle portion 23 is also provided with a boss 29 formed integral therewith and said boss is also bifurcated, having oppositely disposed legs 30.

A pivot pin 31 extends through the legs 30 of the boss 29, as best shown in Figure 1. The pin 31 also extends through one end of a crow 32 in a manner whereby the latter is swingably attached to the boss 29. Means are provided for limiting swinging movements of the crow 32.

As best shown in Figure 1, one end of the crow 32 is provided with a flat surface 33 which, as best shown in Figure 1, is disposed at at angle of 45 degrees with respect to the longitudinal length of the crow, said surface 33 being adapted to bear against the flat surface 34 of the boss 29 for preventing too great an upward movement of the crow. As shown in Figure 1, the flat surface 34 of the boss 29 of the shackle 23 is disposed downwardly and rearwardly of the vehicle during use and at an angle of approximately 45° with respect to the ground 11. The surface 33 of the crow has an arcuate end portion 35 for permitting the crow to swing on its pivot pin 31 against and away from the surface 34 and said arcuate surface 35 of the crow is in communication with the inclined surface 36 thereof. The surface 36 is also disposed at an angle of 45 degrees with respect to the longitudinal length of the crow 32.

It will be seen that at times when the crow 32 is moved in the direction of the arrow 37, said movement is stopped by the surface 36 of the crow abutting the surface 34 of the boss 29 for limiting a swinging movement of the crow with respect to the boss to an arc of approximately 90 degrees for purposes later described.

Figure 2:
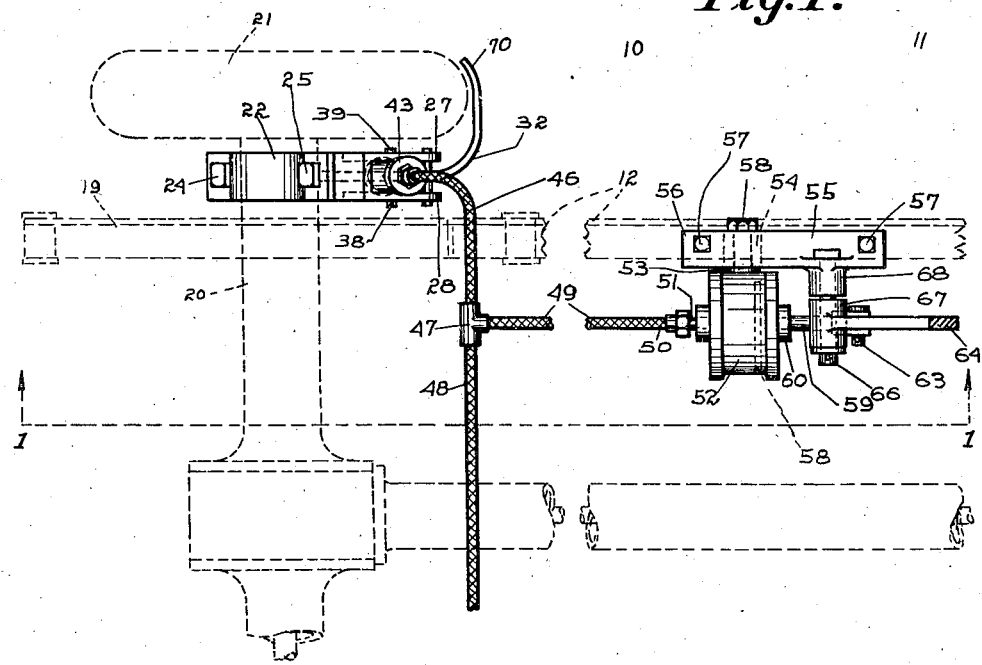
Figure 2 is a top plan view of the embodiment of the invention shown in Figure 1.

A stub axle 38 is disposed through the free end of the arm 28. A similar stub axle 39 is similarly disposed through the other arm 27, as best shown in Figure 2. The axles 38 and 39 are integral with the wall of a later described part 40.

The stub axles 38 and 39 are disposed in axial alignment and project outwardly and oppositely with respect to a cylinder 40. A piston rod 41 projects out of the lower end of the swingable cylinder 40, said projecting end of the piston rod being bifurcated, said bifurcations being pivotally attached, as at 42, to the crow 32. That end of the slidable piston rod 41 which is within the cylinder is provided with a piston head the latter being disposed below the cap 43 of the said cylinder, the said piston head not being shown in the drawings.

It will be understood that at times when fluid under pressure is applied to the upper side of the said piston head and between the latter and the said cap 43, the piston rod 41 is thereby forced downwardly for swinging the crow 32 in the direction of the arrow 37 and at times when said pressure is released, a spring 44 returns the crow, in a direction opposite to the arrow 37, to a normal position, as shown by the full lines of said crow in Figure 1, since the opposite ends of the spring 44 are respectively attached to the crow and to a detent-pin 45, the latter being disposed through the free end portions of the arms 27 and 28.

The upper end of the cylinder is in communication with a flexible hose 46 for receiving fluid under pressure from the latter and, as best shown in Figure 2, the hose 46 is similarly in communication with a T-fitting 47 at one end of the latter.

The other end of the T 47 is in communication with a similar length of hose 48 which extends to a mechanism which is exactly the same as the above described mechanism identified by the parts indicated at 22 through 45, said mechanism being disposed at and secured to the rear axle housing 20 at that end of the latter which is not shown and which is adjacent to the rear wheel of the vehicle which is opposite the wheel 21 thereof.

The T 47 is also in communication with a further flexible hose line 49 for receiving fluid under pressure therefrom.

The end 50 of the conduit or hose 49 is coupled to a pipe 51 for receiving fluid, liquid or oil under pressure from said pipe and the latter similarly receives liquid under pressure from the interior of a second cylinder or drum 52.

The wall of the drum 52 is provided with a stub axle 53 outstanding therefrom and said stub axle 53 is pivotally mounted through a sleeve-bearing 54, the latter being indicated by means of dotted lines. The sleeve-bearing 54 is formed integral with a hanger-bracket 55, the latter being provided with a flanged portion 56.

The flange 56 is secured by any suitable means, such as the bolts 57, to the frame rail 12 of the automobile and, as thus described, it will be understood that the drum 52 is permitted to rotate together with its stub axle 53 in the sleeve-bearing 54, said stub axle 53 being provided with a nut or other suitable detent 58 for preventing said stub axle from becoming detached from the hanger-bracket 55.

Within the drum 52, a piston head 58 is slidably disposed, said head being secured to a piston rod 59 which extends through an end wall of the drum 52 and through a packing gland 60.

That end of the piston rod 59 which is oppositely disposed with respect to the head 50 is bifurcated and an arm 61 of a combination bell-crank lever and foot pedal is secured between and to said bifurcations by means of a pivot pin 62, said bell-crank lever and foot pedal being generally indicated at 63. The other arm 64 of the bell-crank lever terminates in a foot pedal 65, being disposed through a slot provided through the foot board 14 of the vehicle. Adjacent the junction of the arms 61 and 64 of the member 63, the latter is pivotally mounted on a shaft 66. As best shown in Figure 2, the shaft 66 extends through the bushing 67 of the member 63 and also through the embossment 68 of the hanger-bracket 55, whereby the member 63 is pivotally mounted for swinging movements longitudinally of the vehicle 10.

Oil, preferably braking fluid such as is conventionally employed in the conduits of the braking system of a vehicle, is provided in the above mentioned flexible hose conduits 45 and 49 and between the piston head 58 of the drum 52 and the piston of the cylinder 40. It will be seen that at times when the mechanism is in a normal position, as shown in Figure 1, that when the operator presses his foot upon the pedal 65 and moves the latter in the direction of the arrow 69, oil or liquid under pressure is so applied that the crow 32 moves downwardly and against the urge of the spring 44 and since the cylinder 43 is pivotally mounted together with the drum 52 for permitting operation of the several parts of the mechanism.

As best shown in Figure 1, the free end of the crow 32 extends beyond the extended outline of the tread of the wheel 21. As shown in Figure 2, the crow preferably is provided with a portion 70 which is disposed at a right angle with respect to the main body portion of the crow, said portion 70 being disposed across the perimeter of the wheel 21.

During operation and assuming that the operator desires to jack up the wheel 21 of his vehicle, he causes the crow 32 to move downwardly until the portion 70 thereof contacts with the surface 71 of the road and then causes the engine of the vehicle to move the latter forwardly slightly and in the direction of the arrow 69 for causing the main body portion of the crow 32 to become vertically disposed and moved from the full line position thereof to the dotted line position shown in Figure 1 for raising the wheel 21 above the soil for removing the tire of said wheel or the like, and it will be seen that the rear wheel will remain in an elevated position since the inclined surface 36 of the crow engages the surface 34 of the boss 29.

During forward travel of the vehicle and in the event that the surface of the roadway 71 is slippery from rain or the like, or in the event that ice has formed on said surface, the operator upon approaching said icy or wet pavement may manipulate the foot pedal 65 for causing the crow to swing downwardly until the edge 72 thereof engages said surface for checking the skidding of the rear wheels of the vehicle. If desired, the extended portion 70 of the crow may be provided with a nodulated outwardly disposed surface for contact with the roadway for augmenting the anti-skid purpose of the device.

From the foregoing description, it is thought to be obvious that a vehicle anti-skid mechanism and wheel jack constructed in accordance with my invention is particularly well adapted for use by reason of the convenience and facility with which it may be assembled and operated, and it will also be obvious that my invention is susceptible of some change and modification without departing from the principles and spirit thereof and for this reason, I do not wish to be understood as limiting myself to the precise arrangement and formation of the several parts herein shown in carrying out my invention in practice, except as claimed.

I claim:

1. In a motor vehicle, a shackle disposed about the rear axle and adjacent a rear wheel of said vehicle, a crow having an end pivotally attached to said shackle to permit vertical swinging movements thereof, the free end of said crow being disposed beyond the extended outline of the tread of said wheel, a cylinder pivotally attached to said shackle for vertical swinging movements, a piston in said cylinder having a rod slidably disposed through an end of said cylinder, said end of said rod being pivotally attached to said crow between the ends of the latter, a spring for causing the free end of said crow to normally be above a roadway during use, a second cylinder attached to the frame of said vehicle and having a second piston therein, a rod for said second piston slidably disposed through an end of said second cylinder, a flexible conduit between said cylinders, a liquid in said conduit between said pistons, and a lever having an articulated connection with said second piston for causing liquid under pressure to swing the free end of said crow into engagement with said roadway against the urge of said spring at times when said lever is actuated.

2. In a motor vehicle as claimed in claim 1 in which the free end of the crow thereof is disposed across said tread of said wheel.

3. In a motor vehicle as claimed in claim 1 in which the shackle and crow thereof are provided with cooperative means for preventing the crow from swinging past an approximately vertical position at times when the free end of said crow is engaged with a roadway.

4. In a motor vehicle, a support secured to the rear axle and adjacent a rear wheel of said vehicle, a crow having an end pivotally attached to said support for vertical swinging movements at the inner side of said wheel, the free end of said crowd being disposed beyond the tread of said wheel, a cylinder having a piston therein and a rod for said piston slidably disposed through an end of said cylinder, said rod being pivotally connected to said crow between the ends of the latter, the wall of said cylinder being pivotally attached to said support, a spring having its ends respectively attached to said support and crow for urging the free end of crow upwardly, and fluid under pressure actuated means for causing said piston to move the free end of said crow into engagement with a roadway.

5. In a motor vehicle as claimed in claim 4 in which the support thereof includes a two-piece shackle disposed about said rear axle, the ends of said pieces being bolted together for clamping the support to said axle.

6. In a motor vehicle as claimed in claim 4 in which the support and crow thereof are provided with cooperative means for preventing the crow from swinging past an approximately vertical position at times when the free end of said crow engages with a roadway.

7. In a motor vehicle, a shackle disposed about the rear axle and adjacent a rear wheel of said vehicle, a crow having an end pivotally attached to said shackle to permit vertical swinging movements thereof, said pivotally attached end of said crow being provided with a surface disposed at approximately 45 degrees with respect to said crow, a surface on said shackle engageable with said inclined surface to prevent excessive pivotal movements of said crow, said shackle surface being disposed slanting downwardly toward the rear of said vehicle at an angle of 45° with respect to the vehicle, means including a spring for causing said crow to be disposed above the surface of a roadway, fluid under pressure means for causing said crow to swing from said normal position into engagement with said surface, and articulated lever means for actuating said fluid under pressure means.

ABE COHEN.

REFERENCES CITED

The following references are of record in the file of this patent:

UNITED STATES PATENTS

| Number | Name | Date |
| --- | --- | --- |
| 1,946,712 | Reed | Feb. 13, 1934 |
| 2,143,182 | Barr | Jan. 10, 1939 |
| 2,322,358 | Hansen | June 22, 1943 |